(12) United States Patent
Deininger

(10) Patent No.: US 7,488,398 B2
(45) Date of Patent: Feb. 10, 2009

(54) METHOD FOR CHANGING ROLLS OF TUBULAR FILM

(76) Inventor: Karl Deininger, Brahmsgasse 1, 8680 Mürzzuschlag (AT)

( * ) Notice: Subject to any disclaimer, the term of this patent is extended or adjusted under 35 U.S.C. 154(b) by 114 days.

(21) Appl. No.: 10/578,008

(22) PCT Filed: Nov. 4, 2004

(86) PCT No.: PCT/AT2004/000387

§ 371 (c)(1),
(2), (4) Date: Oct. 10, 2006

(87) PCT Pub. No.: WO2005/042347

PCT Pub. Date: May 12, 2005

(65) Prior Publication Data

US 2007/0029037 A1    Feb. 8, 2007

(30) Foreign Application Priority Data

Nov. 4, 2003 (AT) .............................. A 1748/2003
Jul. 22, 2004 (AT) .............................. A 1251/2004

(51) Int. Cl.
*B32B 37/00* (2006.01)
(52) U.S. Cl. .................. 156/73.1; 53/479; 156/227; 156/270; 156/510; 156/580.1
(58) Field of Classification Search ............... 156/73.1, 156/73.3, 250, 580.1, 580.2, 196, 227, 229, 156/269, 270, 494, 510; 53/477, 479, 480, 53/481; 493/189, 199, 200, 201
See application file for complete search history.

(56) References Cited

U.S. PATENT DOCUMENTS

| 4,490,199 | A | 12/1984 | Dunning |
| 5,679,207 | A | 10/1997 | Palone et al. |
| 2002/0074078 | A1* | 6/2002 | Van Heck .................... 156/159 |
| 2003/0089760 | A1* | 5/2003 | Nobbe ........................ 228/171 |

FOREIGN PATENT DOCUMENTS

| DE | 195 15 718 | 11/1996 |
| EP | 1 304 214 | 4/2003 |
| EP | 1 201 585 | 5/2004 |
| JP | 1285550 | 11/1989 |

* cited by examiner

Primary Examiner—James Sells
(74) Attorney, Agent, or Firm—Collard & Roe, P.C.

(57) ABSTRACT

A method for joining an initial section (3) of a film tube (2) which is wound up in a band-like manner on a reel (1) with an end section (4) of a second film tube (5) extending over subsequent processing stations, especially a packaging system, in an at least partly band-like manner, with the band-like initial and end section (3, 4) each having two mutually superimposed outer lateral surfaces (10, 11, 15, 16) which each converge in their boundary regions into two interposed, inwardly folded inner lateral surfaces (17, 18, 19, 20) which thus form an inwardly situated fold axis (S, T). It is provided for in accordance with the invention that in the two outer boundary regions of the initial or end section (3, 4) a tab (7, 27) each is formed by placing a cut, which tab is joined in a tension-proof manner with the opposite section (3, 4), with the initial section (3) overlapping the end section (4).

11 Claims, 10 Drawing Sheets

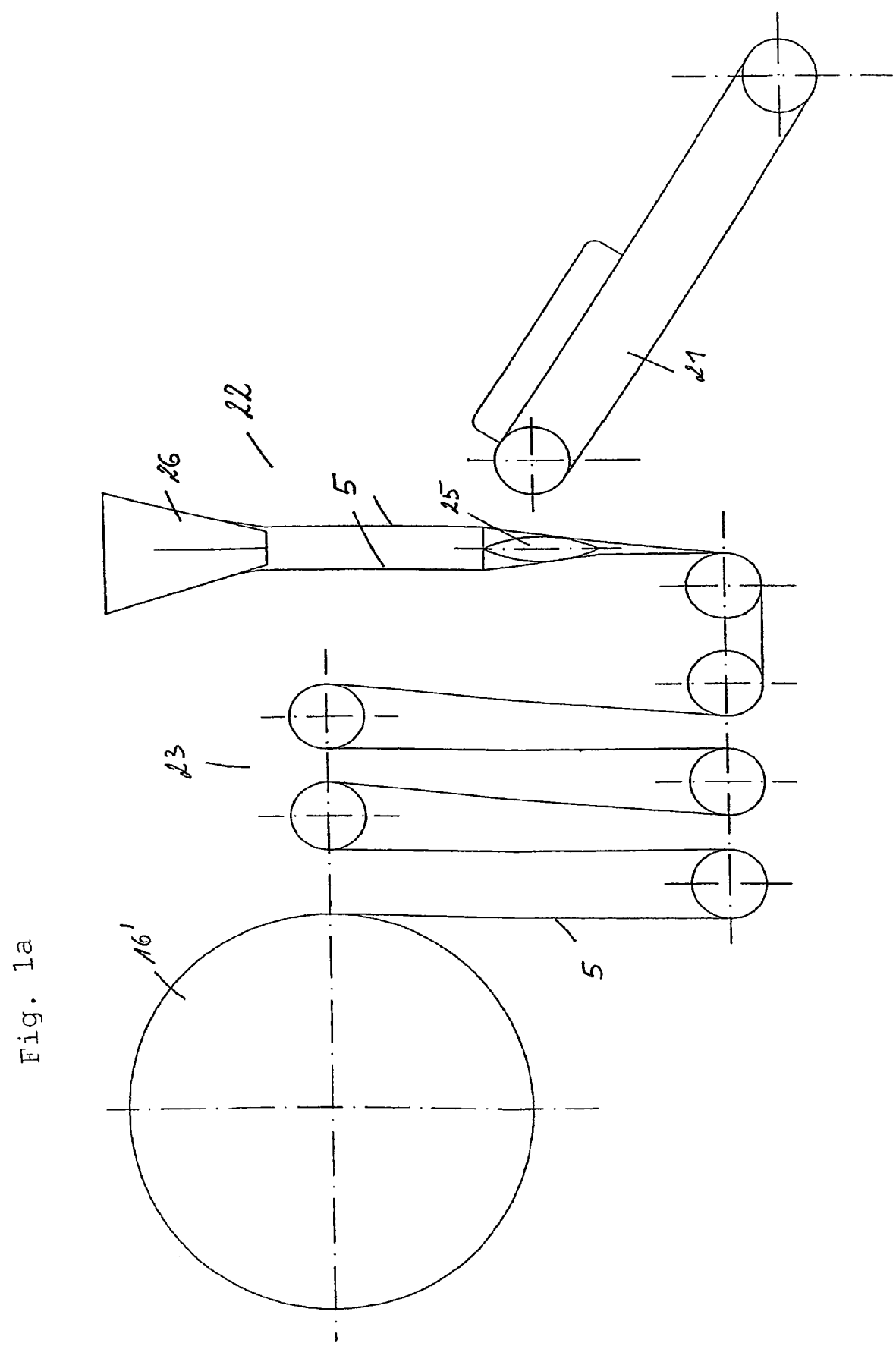

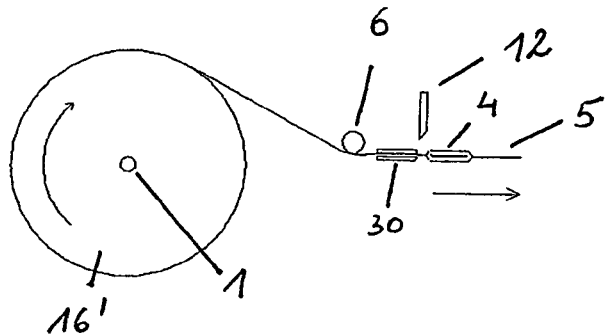
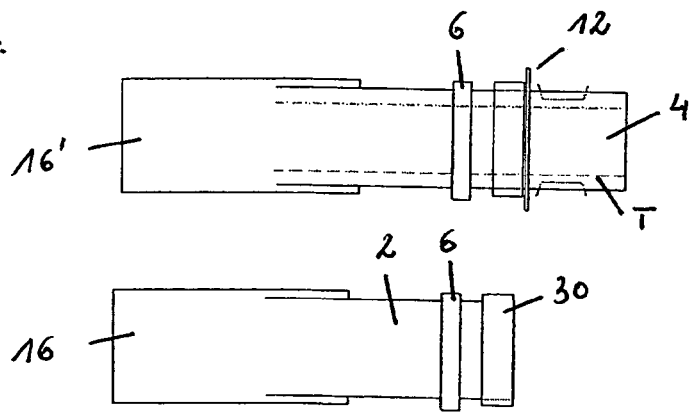
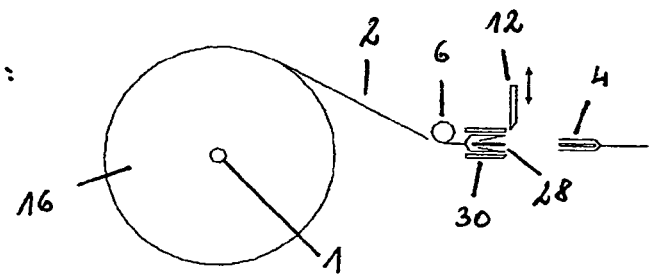
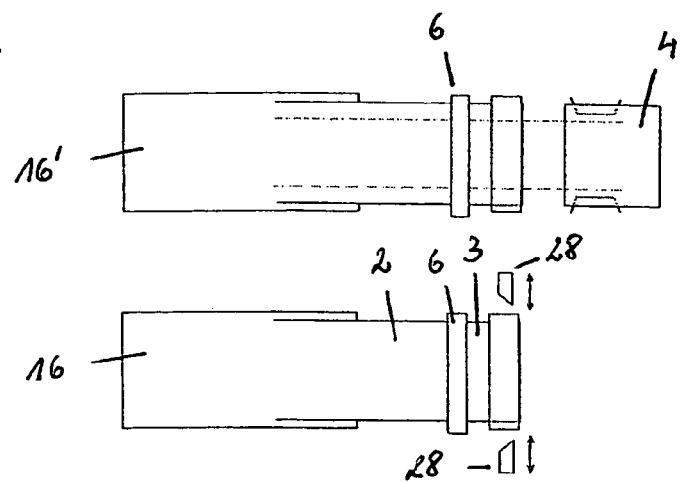

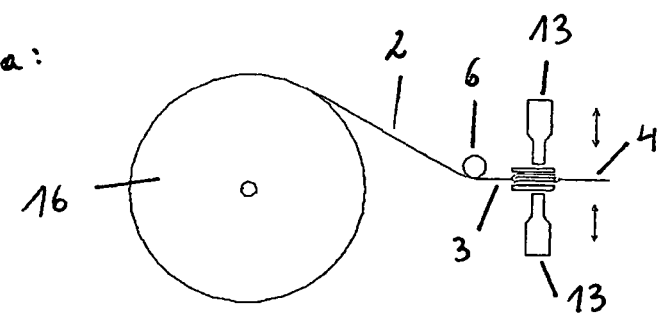
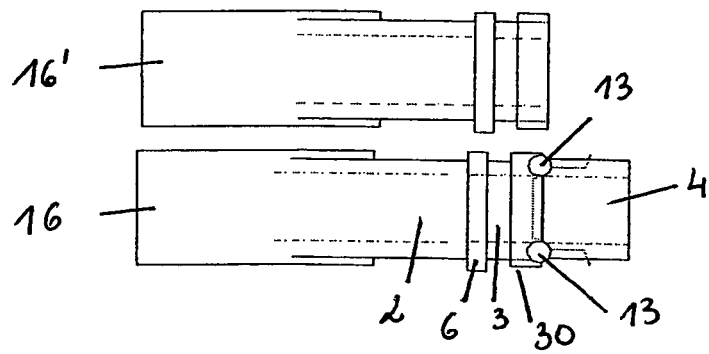
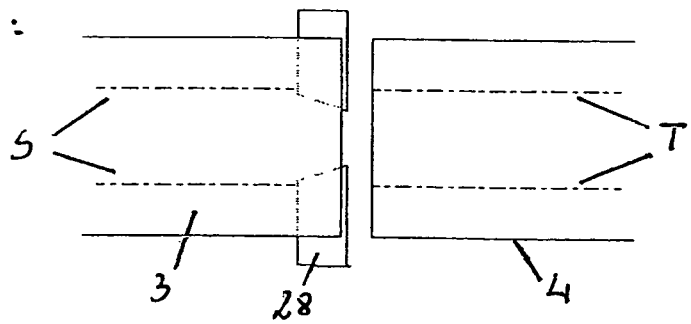
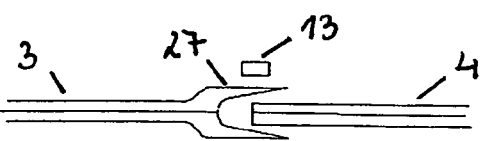
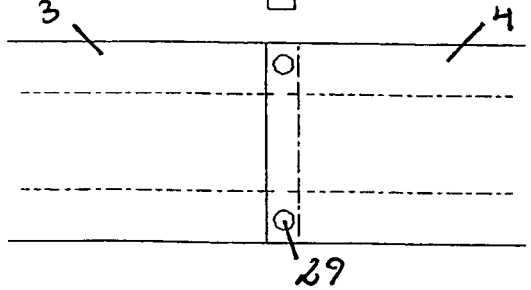

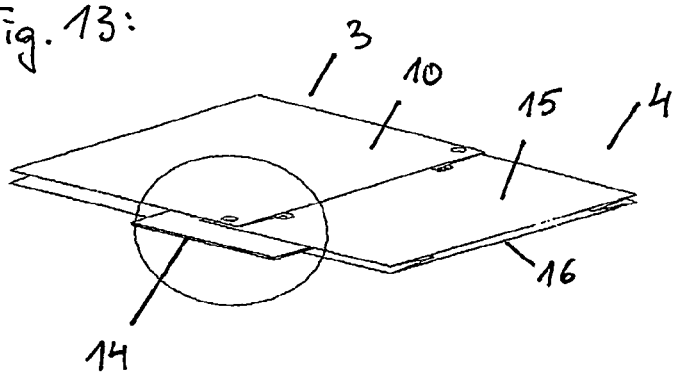
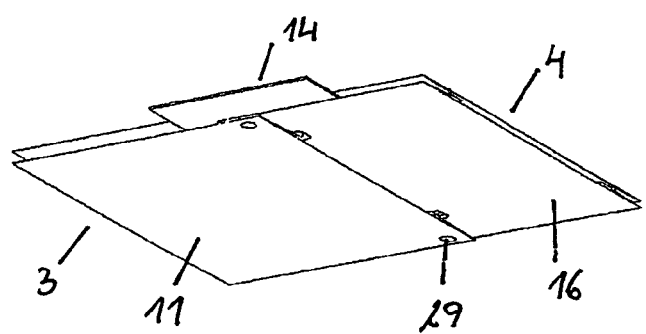
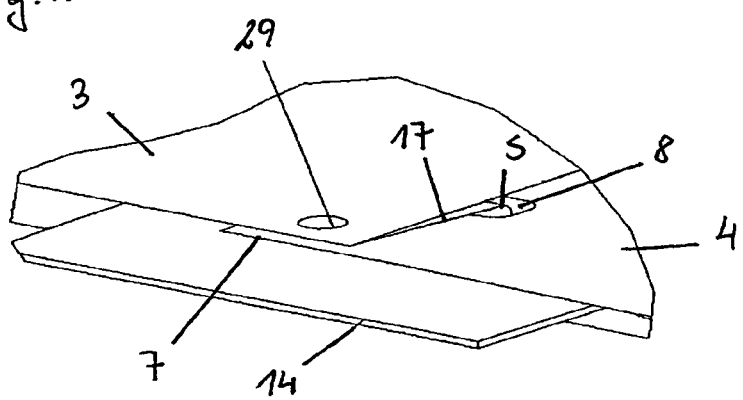
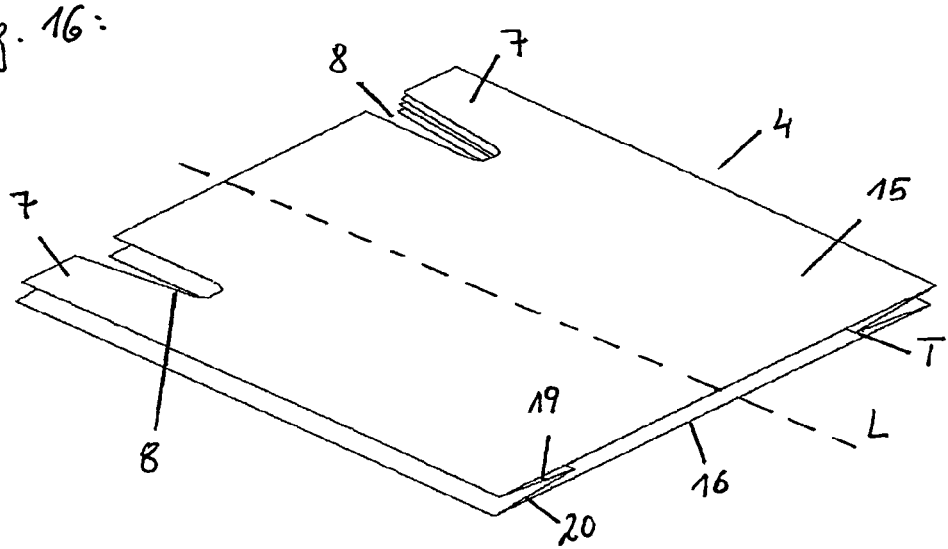

METHOD FOR CHANGING ROLLS OF TUBULAR FILM

CROSS REFERENCE TO RELATED APPLICATIONS

Applicant claims priority under 35 U.S.C. §119 of Austrian Application No. A 1748/2003 filed Nov. 4, 2003 and Austrian Application No. A 1251/2004, filed Jul. 22, 2004. Applicant also claims priority under 35 U.S.C. §365 of PCT/AT2004/000387 filed Nov. 4, 2004. The international application under PCT article 21(2) was not published in English.

BACKGROUND OF THE INVENTION

1. Field of the Invention

The invention relates to a method for joining an initial section of a film tube wound in a band-like manner on a reel with an end section of a second film tube, especially for packaging systems, and a packaging system.

2. Prior Art

Film tubes are usually wound up on reels which are held in a rotatable fashion and from which the film tube is unwound and supplied to further processing steps. The film tube is also designated below as a tube roll. Film tubes are used in packaging systems in numerous ways, e.g. in bagging systems for packing goods into bags or in palletizing systems for wrapping goods held on pallets.

In bagging systems for example, the film tube is wound off from such a tube roll and filled with material in subsequent sections of the machine. For this purpose it is necessary that the film tube which is present at first in a band-like manner needs to be opened in order to enable its filling. This occurs with the help of a mandrel which is positioned in the axial direction within the film tube, so that the film tube is opened when passing the mandrel. Such a configuration is also known as a "flying mandrel" because the mandrel needs to be held in the interior of the film tube in stable fixing. As an alternative to such a flying mandrel, it is also possible to use wedges or vacuum suction devices, especially when processing bags with slit folds.

The opening of the film tube produced with the help of the mandrel is now available for filling with goods in bagging systems or for wrapping goods in palletizing systems. In the case of bagging systems, the respective film tube section is sealed on either side of the filled material with the help of special welding methods for example, and the packaged goods can be removed.

There is a special problem-concerning the exchange of the reel when the film tube wound on the reel is completely used up. In a conventional manner, the packaging system is stopped, the reel of the consumed tube roll is removed and a new tube roll is made available instead. The initial section of the new tube roll is then inserted manually in a positioning and tensioning station downstream of the tube roll and is supplied to the next following sections within the system. In particular, the mandrel or wedge is manually inserted into the initial section of the new tube roll. The packaging system can only be started again when the mandrel or wedge has been inserted.

The change of a reel thus leads to longer standstill periods of the entire system. Notice must be taken that tube rolls usually comprise approximately 1200 bags. The processing speed of bagging systems is close to approximately 1800 bags per hour however. A tube roll is thus used up in approximately 40 minutes. The change of the tube roll takes about 10 to 20 minutes. The bagging system is thus at a standstill up to a third of its operating period during operation. Increasing processing speeds for film tubes lead to an increasing deterioration of the ratio between working time and standstill time of the system.

Therefore, it has been proposed not to wind up the film tubes on reels at the producer's side but to provide special containers in which the band-like packaging material is hold in a folded manner so that the second end of the band-like packaging material rests at least over some time and is accessible from the outside of the container during the first end is fed into the packaging system. This makes it possible to work with the second end and especially to join it with an end section of a band-like packaging material of a successive, second container during the feed of the first end. Thus, after the packaging material has been completely used up in the first container, withdrawal from the second container is automatically started. Already during start up of the packaging system two ends of packaging material which are located in two successive containers may be joined with each other so that depending on the number of available containers an arbitrary supply of packaging material can be provided without the need for stopping the packaging system.

For the folded storage of the band-like packaging material different possibilities have been proposed, e.g., in form of a pile in which two planes of the pile of the packaging material being each adjacent to a folding axis are lying basically horizontally upon each other. In this case, the first end of the band-like packaging material may be adjacent to the upmost plane of the pile, and the second end of the band-like packaging material may be adjacent to the bottom plane of the pile, so that starting with the end of the packaging material which is fed to the processing system the material is taken from the upper areas of the pile. The end which is at last fed to the processing system may, e.g., be pulled from the bottom along a side wall of the container to the area of the uppermost plane of the pile from where it may project over the upper bounds of the container. Alternatively, an opening may be provided in the bottom area of the container for taking out the second end section. These measures are only feasible in cases where the band-like packaging material is indeed provided in a folded manner.

EP 1 201 585 A1, therefore, proposes to cut the initial section of a new tube roll in a trapezoid manner, to place the tab thus formed over the end section of an old tube roll, which end section has not been cut in any way, and to join the two sections. Since, according to EP 1 201 585 A1, the end section of the old tube roll is not cut in a trapezoid manner for the formation of swivelable tabs, the formation of a tension-proof connection, e.g., by welding, can only occur, if a support is provided inside the downstream film tube. This support, however, must be held in place inside the downstream film tube for which purpose guiding rolls are provided in EP 1 201 585 A1. A setting of this kind where a support permanently guided by guiding rolls is provided inside the film tube, however, has at least two significant disadvantages. First, in particular the guiding rolls inside the downstream film tube need lubrication, so that application of a method according to EP 1 201 585 A1 is questionable for, e.g., bagging systems for food or feed. Secondly, a method according to EP 1 201 585 A1 considerably limits the speed of the film band, since the heat transfer to the support guided inside the downstream film tube would otherwise be too big. In particular, the plasticity limit of plastics usually used for film tubes would be reached locally, so that, e.g., during a stop of the film undesired weldings between the support or its guiding rolls and the film would be inevitable.

It has, therefore, already been proposed to form a tab by placing a cut at the initial section and the end section, which can be flipped open and each of which is arranged in the region of the longitudinal axis, i.e. in the central region of the respective film tube. The tabs are placed above each other and joined in a tension-proof way. The welding anvil necessary for establishing a tension-proof joint by welding must be slid laterally into the central regions of the film tubes to be joined in order to place the centrally arranged tabs and to enable the same to be welded.

In order to produce such tabs, it is necessary that the boundary regions are cut in an oblique way relative to the longitudinal axis of the film tube, so that the initial and end section taper at the end side, e.g. in a trapezoid manner. Such a type of connection can, in principal, be applied to any kind of film tube, however, disadvantages can occur especially in tubes with side folds because tubes with side folds often use so-called side wedges. These side wedges engage in the side folds and are used for widening the film tube. In the type of connection thus described it may occur, as a result of the formation of gaps in the boundary regions of the film tubes, that the side wedges unthread at the joining points.

SUMMARY OF THE INVENTION

It is therefore the object of the present invention to avoid longer standstill periods of the entire system during a change of the tube roll. It is a particular object that after the joining of the old with the new film tube a tube is produced again whose opening cross section at the joining point is not reduced or reduced only marginally. The invention relates especially to tubes with side folds where the band-like initial section and optionally the band-like end section comprise a side fold which extends in the longitudinal direction of the film tube and faces inwardly. This goal is achieved by one or more embodiments of the invention.

One or more embodiments of the invention relate to a method for joining an initial section of a film tube which is wound up in a band-like manner on a reel with an end section of a second film tube extending over subsequent processing stations, especially a packaging system, in an at least partly band-like manner, with the band-like initial and end section each having two mutually superimposed outer lateral surfaces which each converge in their boundary regions into two interposed, inwardly folded inner lateral surfaces which thus form an inwardly situated fold axis. It is now provided for in accordance with the invention that in the two outer, boundary regions of the end section a tab each is formed by placing a cut, which tab is joined in a tension-proof manner with the opposite initial section, with the initial section overlapping the end section, and the placement of the cut on the end section is carried out in such a way that a tab each which projects in the longitudinal direction of the film tube is formed in the boundary regions of the end section, which tab is inserted between the inner lateral surfaces of the initial section and is joined to the initial section in a tension-proof way This ensures that the film tube of the consumed tube roll forms an approximately continuous film tube with the new tube roll, which film tube extends over the entire system. For this purpose it is not necessary that the joining section forms a tight tube section because the joining section need not necessarily be used for the filling. It must offer a tension-proof connection however so that the two joined film tubes can be smoothly guided through the further sections of the system and especially the mandrel can be transferred from the old film tube to the new film tube. In particular, the method in accordance with the invention ensures that after the joining of the two film tubes a tube is produced again whose opening cross section is not reduced at the joining point or reduced to only a marginal extent.

When using bags with side folds, the method in accordance with the invention offers advantages because the tabs are formed in the two outer boundary regions of the initial or end section and are also joined there in a tension-proof way. A side wedge inserted into the side fold will thus not unthread at the joining point of two film tubes. For this purpose it is merely necessary to form a tab either on the initial section or the end section by placing a cut, but not necessarily on both sections. Since there is no tension-proof joining in the central regions of the film tubes in this kind of connection, it is necessary that the initial section overlaps the end section, so that both a flying mandrel as well as the side wedge are transferred securely from the end section to the initial section.

For producing such a tension-proof connection it is provided for in accordance with one or more embodiments of the invention that a tab each is formed in the two outer boundary regions of the initial or end section by placing a cut. Such a cut can be placed in different ways. The placing of the cut can occur in the two outer boundary regions of the initial section along the inner fold axis, and the thus formed tabs are each placed at the initial section from the outside onto the outer lateral surfaces of the end section and are joined to the same in a tension-proof way. In order to place the cut a cutting element arranged on either side of the film tube is used by horizontally moving the cutting element from a first position in which it is spaced from the film tube to a second position in which it slits open the film tube laterally in the longitudinal direction of the film tube.

The placement of the cut in the end section can especially occur in such a way that slots are formed in the boundary regions of the end section which each extend in the longitudinal direction of the film tube into which the respective inner side surfaces of the initial section are inserted along their fold axis. It would also be possible to form not only slots, and thus produce laps in the boundary regions of the end section, but to cut out a portion of the entire central region of the end section.

It can also be provided in accordance with one or more embodiments of the invention in an advantageous manner that the width of the tabs corresponds substantially to the width of the respective inner lateral surfaces of the initial section.

It is provided for in accordance with one or more embodiments of the invention that the tension-proof connection of the initial and end sections of the film tubes is formed by welding. In particular, welding methods on the basis of ultrasonic sound have proven to be advantageous.

Prior to placing the initial and end section above one another it is advantageous in accordance with one or more embodiments of the invention, if the initial section is widened by means of negative pressure or electrostatic methods.

As was already mentioned above, welding methods are preferably used for producing a tension-proof connection. In an advantageous working method for welding the initial and end sections of the film tubes, a welding anvil is each laterally inserted between the inner lateral surfaces. A tab each and a boundary region each of the initial and end section is placed thereon and welded together One or more embodiments of the invention relate to a packaging system with a reel on which a film tube is wound up, a positioning and tensioning station which unwinds the film tube from the reel and supplies to subsequent sections of the system, a packaging unit for processing a film tube section and a conveying device for removing packaged goods. It is provided for in accordance with the invention that at least one cutting apparatus for cutting the film tube and a welding station for processing the film tube is arranged between the positioning and tensioning station and the packaging unit, with the cutting apparatus being a cutting element arranged on either side of the film tube, which cutting element is horizontally movable from a first position in which it is spaced from the film tube to a second position in which it slits open the film tube laterally in the longitudinal direction of the film Lube.

The welding station is used for producing a tension-proof bonding. In accordance with one or more embodiments of the invention, an ultrasonic welding unit is concerned. In accordance with one or more embodiments of the invention, pivoting suction means are arranged between the positioning and tensioning station and the packaging unit which are used for widening the initial section.

BRIEF DESCRIPTION OF THE DRAWINGS

The invention is explained in closer detail by reference to the enclosed drawings, wherein:

FIG. 1a shows a schematic representation of a packaging system with a flying mandrel according to the state of the art;

FIG. 2a shows a schematic representation of a partial section of a packaging system in an elevated view, in which a first step of the bonding method in accordance with the invention is shown, where the end portion of a consumed film tube is cut off from the film tube of the same roll which extends over subsequent processing stations;

FIG. 2b shows the schematic representation according to FIG. 2a from above, with the upper illustration showing the consumed film tube and the lower illustration showing the new film tube;

FIG. 3a shows a schematic representation of a partial section of a packaging system in an elevated view showing a further step of the joining method in accordance with the invention, in which the initial section according to an embodiment of the method is slit open on the side;

FIG. 3b shows the schematic representation according to FIG. 3a from above, with the upper representation showing the used tube roll and the lower representation the new tube roll.

FIG. 6a shows a schematic representation of a partial section of a packaging system in an elevated view showing a further step of the joining method in accordance with the invention, in which the initial and end sections are welded to each other;

FIG. 6b shows the schematic representation according to FIG. 6a from above, with the upper representation showing the used tube roll and the lower representation showing the new tube roll;

FIG. 7a shows a lateral view of a schematic representation of the initial and end section, with the initial section being slit open on the side in accordance with a step of an embodiment of the method in accordance with the invention;

FIG. 7b shows the schematic representation according to FIG. 7a from above;

FIG. 8a shows a side view of a schematic representation of initial and end section, with the initial section according to a further step of an embodiment of the method in accordance with the invention being widened and placed over the end section;

FIG. 8b shows the schematic representation according to FIG. 8a from above;

FIG. 13 shows a perspective view according to FIG. 12;

FIG. 14 shows the perspective view according to FIG. 13 from below;

FIG. 15 shows a detailed view of the marked region according to FIG. 13, and

FIG. 16 shows a perspective representation of the end section which was provided with slits in the direction of the longitudinal axis in accordance with FIG. 10 according to a step of an embodiment of the method in accordance with the invention.

DETAILED DESCRIPTION OF THE DRAWINGS

Figure 1B:
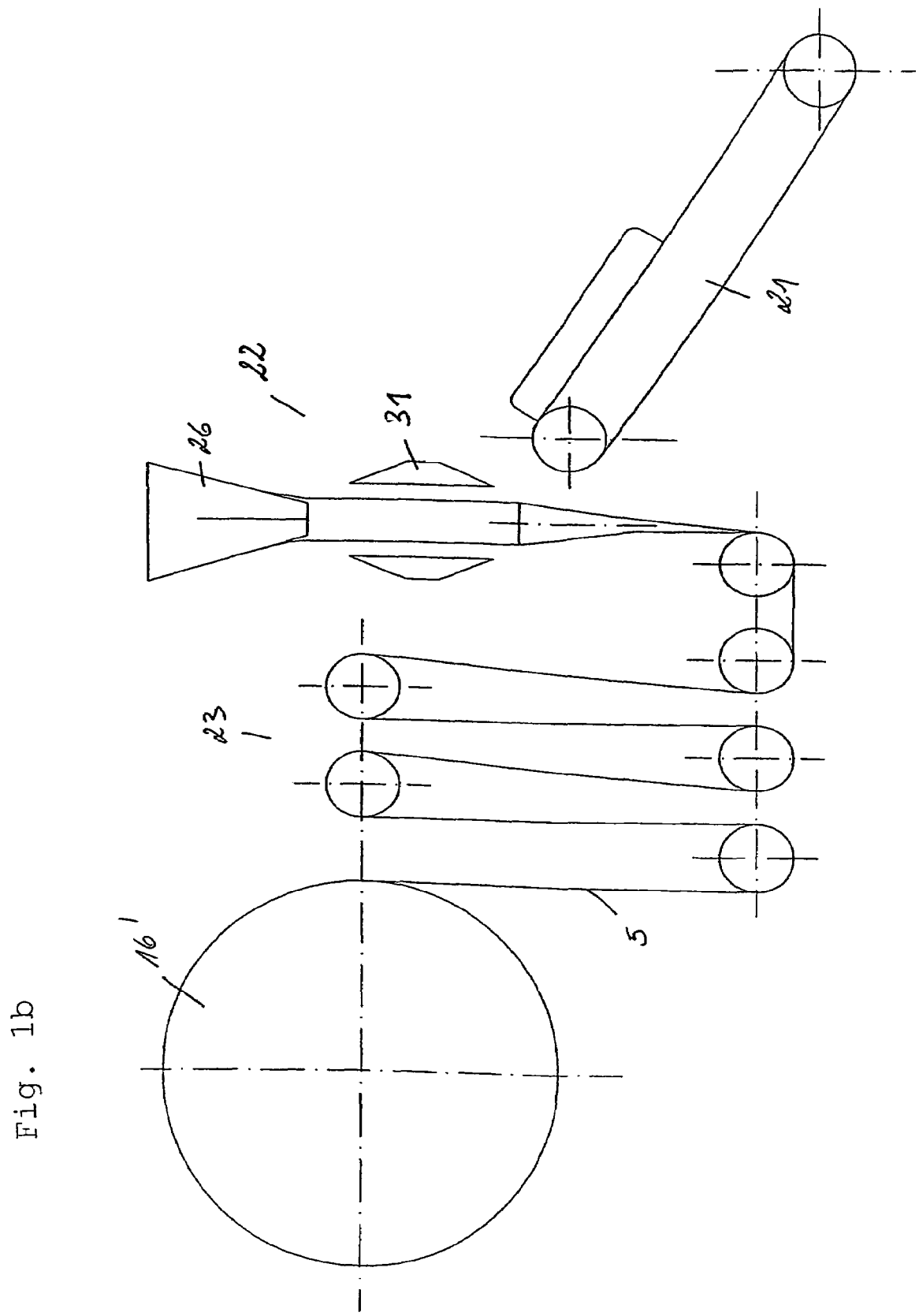
FIG. 1b shows a schematic representation of a packaging system with vacuum suction means according to the state of the art.
Figure 1C:
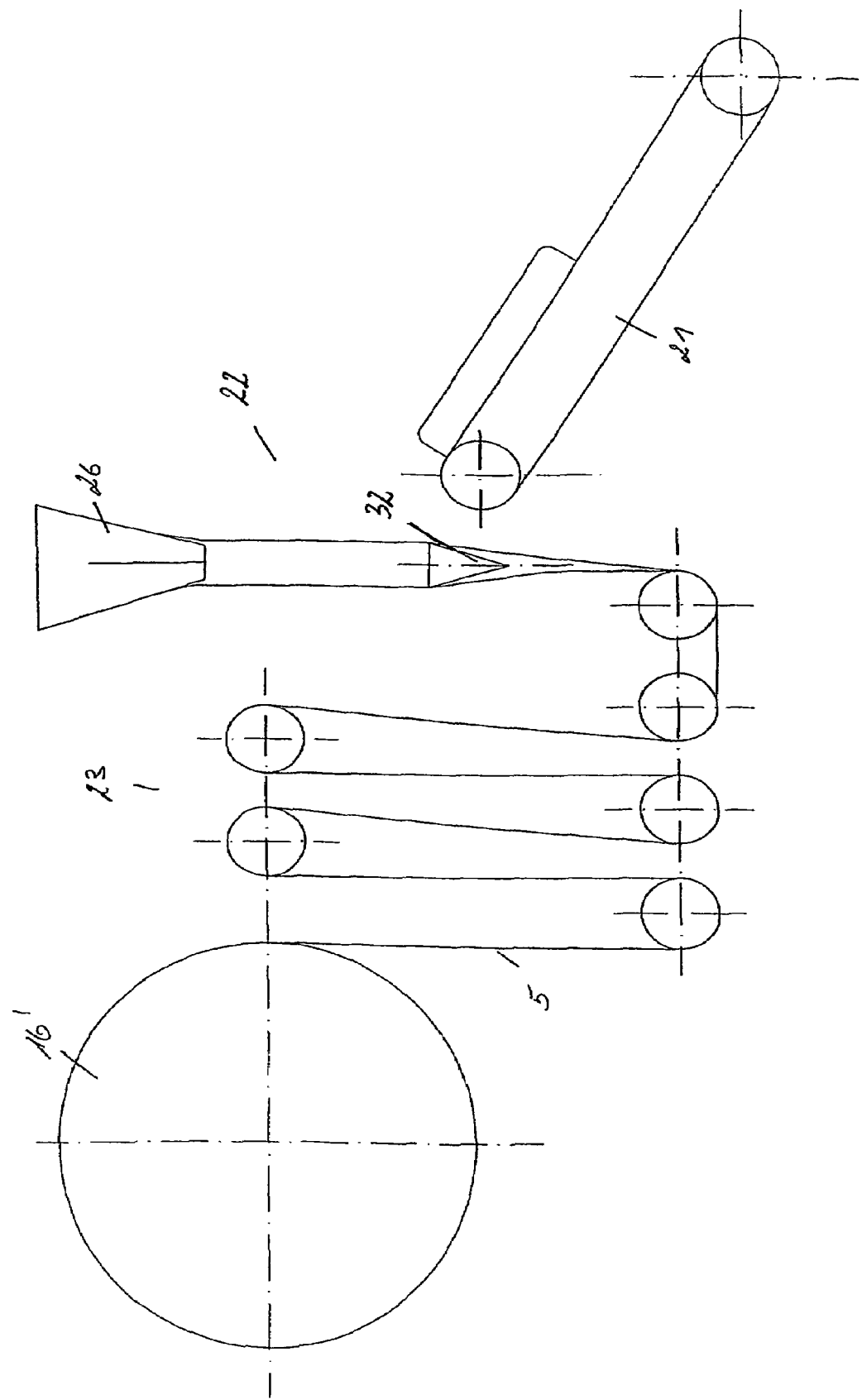
FIG. 1c shows a schematic representation of a packaging system with a lateral wedge according to the state of the art.

FIGS. 1a through 1c show a schematic representation of a conventional bagging unit with a tube roll 16', a tensioning and buffering unit 23, a filling or packaging unit 22 and a conveyor 21. Prior to filling it is necessary in the filling or packaging unit 22 to open the film tube 5, which is ensured with the help of a mandrel 25 inserted into the film tube 5. The film tube 5 can now be filled via a filling funnel 26 for example. The film tube 5 is cut off at either side of the filled section and the ends are welded together. The packaged goods can now be removed by the conveyor 21. The working steps in such systems proceed in an automated fashion and are controlled by plant control systems.

FIG. 1b shows a further embodiment of a conventional bagging system, in which vacuum suction means 31 are used for opening the film tube 5 instead of the mandrel 25. This is especially recommendable when using slit gusseted bags. FIG. 1c schematically shows the use of a side wedge 32. In all these embodiments there is the problem of changing the reel when a film tube 5 wound up on reel 1 is fully used up. Conventionally, the packaging system is stopped, the reel 1 of the consumed film tube 16' is removed and instead a new film tube 16 is provided. The initial section of the new film tube 16 is then inserted manually into a tensioning and buffering unit 23 which is directly downstream of the film tube 16 and is then supplied to the further system sections. In particular, the mandrel 25 or wedge 32 is manually introduced into the initial section of the new tube roll 16. The packaging system can only be started when the mandrel 25 or wedge 32 has been inserted. This leads to longer standstill periods of the entire system.

These standstill periods can be avoided in accordance with the invention by the arrangement of a cutting apparatus 12, 28 and a welding station 13, as will be explained below by reference to the following FIGS. 2 to 16.

Figure 1D:
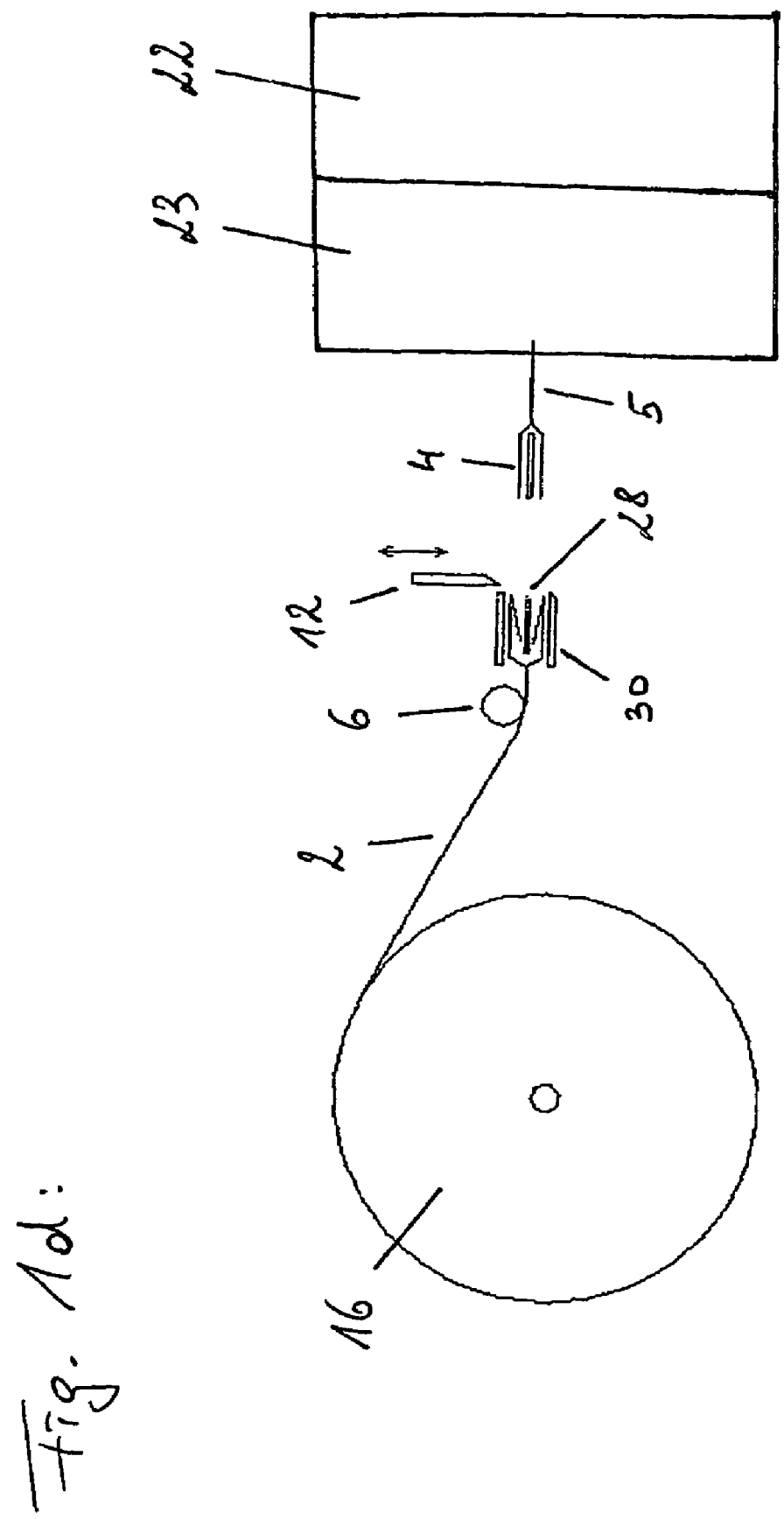
FIG. 1d shows a schematic representation of a packaging system according to the invention.

FIG. 1d schematically shows at first an overview of the entire system with the new film tube 2 which is wound up in a band-like manner on the new tube roll 16, with cutting apparatuses 12, 28, the welding station 13 (not shown in FIG. 1d), buffering unit 23 and the packaging unit 22. The filling or packaging unit 22 may concern a filling unit of a bagging system or a packaging unit for wrapping up pallets with the help of a film tube 2, 5. In contrast to conventional systems according to FIGS. 1a through 1c, cutting units 12, 28 and a welding station 13 are provided in accordance with the invention between the tensioning and positioning unit 6 and the buffering unit 23.

The new film tube 16 is supplied by a roll hopper for which different embodiments are possible. A linear roll hopper can be provided where the tube rolls 16 are aligned in a coaxial manner and are successively supplied to a changer. The changer removes a tube roll 16 from the linear roll hopper and positions it relative to the remaining sections 22, 23 of the system, so that the initial section 3 of the new film tube 16 can be supplied to the other sections 22, 23 of the system. According to an alternative embodiment of a roll magazine, it is also possible to provide a rotary roll hopper where the tube rolls 16 are provided with a circular arrangement.

Moreover, a continuous lift is also possible, so that the tube rolls 16 can also be moved in a perpendicular direction.

The initial section 3 of the new film tube 2 of a new tube roll 16 is positioned and fixed in the feeding device of the changer in such a way that the initial section 3 is suspended in a defined position. It is well protected against disturbing electromagnetic influences. The initial section 3 is then grasped by the tensioning and feed rollers 6 (FIG. 2).

The end section 4 of the old film tube 5 is grasped in a pneumatic way during this working step and cut off if necessary.

A first embodiment of the method in accordance with the invention, namely the one where the placement of the cut occurs in the two outer boundary regions of the initial section 3 along the inwardly disposed fold axis S and where the thus formed tabs 27 are each placed from the outside onto the outer side surfaces 15, 16 of the end section 4 and are joined in a tension-proof way with the same, is explained below by reference to FIGS. 2 to 9.

FIG. 2a shows a schematic representation of a partial section of a packaging system in an elevated view showing a first step of said first embodiment of the joining method in accordance with the invention where the end portion of a used tube roll 16' is cut off with the help of a cutting element 12 from the film tube 5 of the same roll which extends over downstream processing stations. The end section 4 of the film tube 5 is thus formed. The film tube 5 is supplied to subsequent sections of the system via a positioning and tensioning station 6 which unwinds the film tube 5 from the reel 1. The film tube 5 concerns a side fold tube 5 with the inwardly disposed fold axis T. FIG. 2b shows the schematic representation according to FIG. 2a from above, with the upper representation showing the used tube roll 16' and the lower representation showing the new tube roll 16 with the new film tube 2.

As is shown in FIG. 3, the initial section 3 of a new film tube 2 is guided in a further method step over the positioning and tensioning station 6 and slit open at first on the side along the fold axis S with the help of the cutting elements 28. FIG. 3b shows the schematic representation according to FIG. 3a from above, with the two representations of FIG. 3b not showing a spatial arrangement of old and new tube roll, but instead illustrating a time sequence. As a result, the old tube roll 16' can already have been removed and the new tube roll 16 can already be situated at the earlier position of the old tube roll 16' where the new film tube 2 is slit open with the help of the cutting elements 28.

This method step is also shown especially in FIG. 7. FIG. 7a shows a lateral view of a schematic representation of initial and end section 3, 4, with the initial section 3 being slit open along the fold axis S with the help of the cutting elements 28. FIG. 7b shows the schematic representation according to FIG. 7a from above.

Figure 4A:
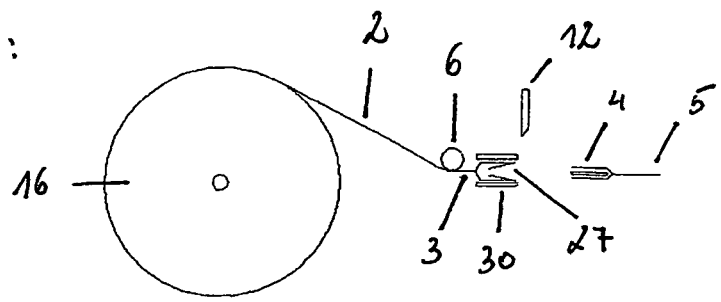
FIG. 4a shows a schematic representation of a partial section of a packaging system in an elevated view showing a further step of the joining method in accordance with the invention, in which the initial section is widened.
Figure 4B:
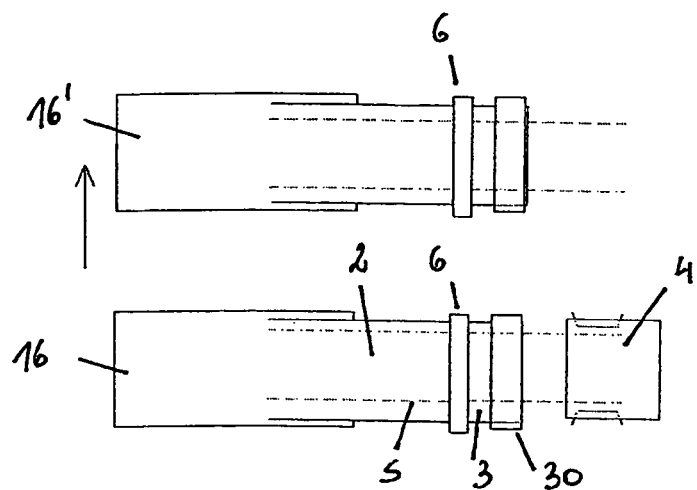
FIG. 4b shows a schematic representation according to FIG. 4a from above, with the upper representation showing the consumed tube roll and the lower representation showing the new tube roll which was now brought to the earlier position of the consumed tube roll and is now opposite of the end section.

FIG. 4a shows a schematic representation of a partial section of a packaging system in an elevated view for the step of the joining method in accordance with the invention where the tabs 27 of the initial section 3, which were formed by the preceding placement of the cut, are widened with the help of pivoting suction means 30 for example. FIG. 4b shows the schematic representation according to FIG. 4a from above, with the upper representation showing the used tube roll 16' and the lower representation showing the new tube roll 16 which has now been entered at the earlier position of the used tube roll 16' and is now opposite to the end section 4.

Figure 5A:
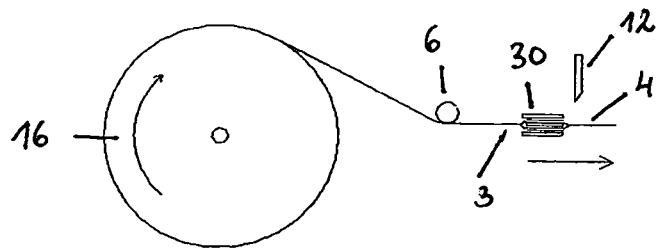
FIG. 5a shows a schematic representation of a partial section of a packaging system in an elevated view showing a further step of the joining method in accordance with the invention, in which the initial and end sections are placed above each other.
Figure 5B:
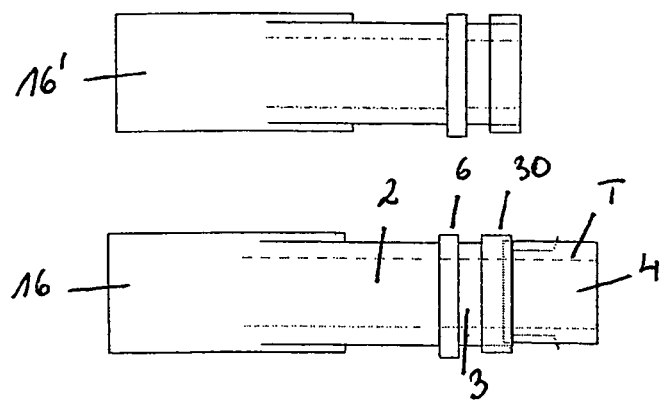
FIG. 5b shows the schematic representation according to FIG. 5a from above, with the upper representation showing the used tube roll and the lower representation showing the new tube roll.

In a further method step according to FIG. 5, the initial and end section 3, 4 are placed above one another, with the initial section 3 overlapping the end section 4. FIG. 5b shows the schematic representation according to FIG. 5a from above, with the upper representation showing the used tube roll 16' and the lower representation showing the new tube roll 16.

In the next method step, the tension-proof connection is produced between the initial section 3 and the end section 4. As is indicated in FIG. 6, this occurs with the help of a welding station 13. The welding station preferably concerns a welding appliance based on ultrasonic sound, with the welding tools 13 also being known as sonotrodes. These sonotrodes 13 are placed with pressure on the tabs 27 or the boundary regions of the end section 4 which are made to vibrate with the help of ultrasonic sound. The input power of the ultrasonic welding appliance is chosen especially depending on the film thickness and the film quality in order to avoid problems with cooling and conglutinations. A relative movement between the tabs 27 and the boundary regions of the end section 4 is obtained in the contact regions, which movement leads to the generation of heat and subsequently to plastifying, i.e. the melting down of the plastic material. The plastic material is thus joined by means of mechanical oscillations.

Other methods for producing a tension-proof connection are also possible, e.g. by means of clamps or by gluing. It would principally be possible to provide the inner surfaces of the tabs 27 of the new film tube 2 with an adhesive material and to press the same onto the end section 4 of the old film tube 5. In this case the adhesive material would have to cure in a sufficiently quick manner, which is not the case in currently available adhesives.

Figure 9:
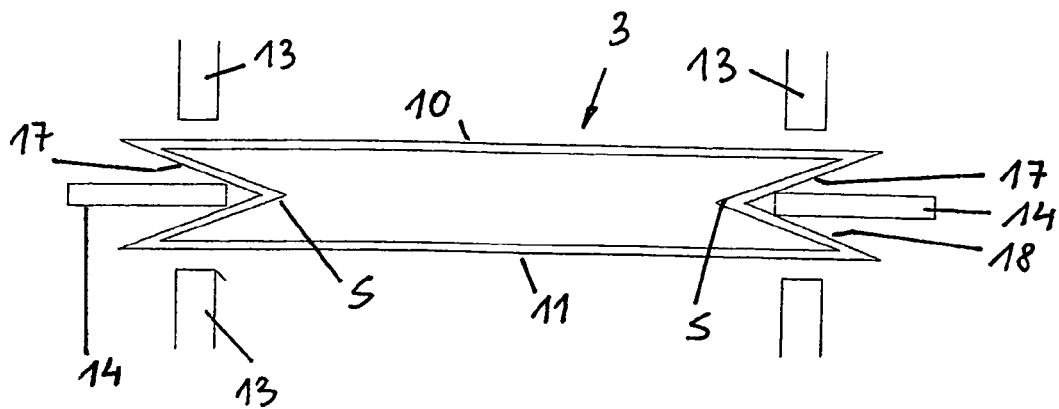
FIG. 9a shows a schematic representation of the initial section along the longitudinal axis of the new film tube, with the initial section being slit open on the side according to a step of an embodiment of the method in accordance with the invention.

FIG. 6b shows again the schematic representation according to FIG. 6a from above. The method step as shown here can also especially be seen in FIG. 8. FIG. 8 shows a side view of a schematic representation of the initial and end section 3, 4, with the initial section 3 being placed over the end section 4 and is welded in the boundary regions with the end sections 4. The welding points 29 are indicated in the FIG. 8b which is a schematic representation according to FIG. 8a from above. In the central regions of the film tubes 2 and 5 it is not necessary that any welding occurs there if the initial section 3 was placed over the end section 4. In this way, an inserted mandrel 25 is easily transferred from the old film tube 5 to the new film tube 2, even when no welding seam has been placed in the central regions. It can be seen directly that the same also applies to a side wedge 32 which is guided between the inner lateral surfaces 17, 18, 19, 20 of the side folds. The welding in the boundary regions leads to the advantage that the welding anvil 14 provided for the welding does not have to be inserted into the central regions of the film tubes 2, 5, but that it merely needs to extend into the boundary regions of the film tubes 2, 5. It can be guided approximately between the inner side surfaces 17, 18, 19, 20 of the side folds where it can also remain during the other method steps. For clarification purposes, FIG. 9 shows a view of the initial section 3 of the new film tube 2 along the longitudinal axis L. The drawing especially shows the relative arrangement of the inner side surfaces 17, 18 with their inner fold axis S and the welding anvil 14 inserted between said side surfaces 17, 18. The welding heads of the welding system 13 can be seen above or below the outer side surfaces 10, 11. In the embodiment of the method in accordance with the invention as described here, the laterally introduced cutting elements 28 can also be used as a welding anvil. Since the insertion of a welding anvil into the central regions of the film tubes 2, 5 are omitted prior to welding, the process is accelerated considerably.

A second embodiment of the method in accordance with the invention will be explained below by reference to FIGS. 10 to 16, which embodiment is such where the placement of the cut in the end section 4 is made in such a way that a tab 7 projecting in the longitudinal direction L of the film tube 5 is formed in the boundary regions of the end section 4, which tab is inserted between the inner side surfaces 17, 18 of the initial section 3 and is joined in a tension-proof way with the initial section 3. The mechanical implementation occurs in analogy to the embodiment described for the first time above in FIGS. 2 through 6. FIGS. 10 through 16 only describe the geometrical conditions of the type of joining according to the second embodiment.

Figure 10:
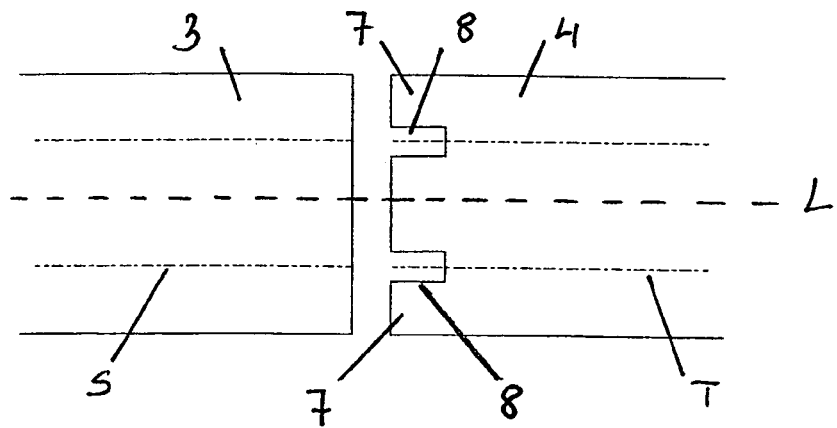
FIG. 10 shows a schematic representation of initial and end section from above, with the end section being provided with slits in the direction of the longitudinal axis according to a step of a further embodiment of the method in accordance with the invention.
Figure 11:
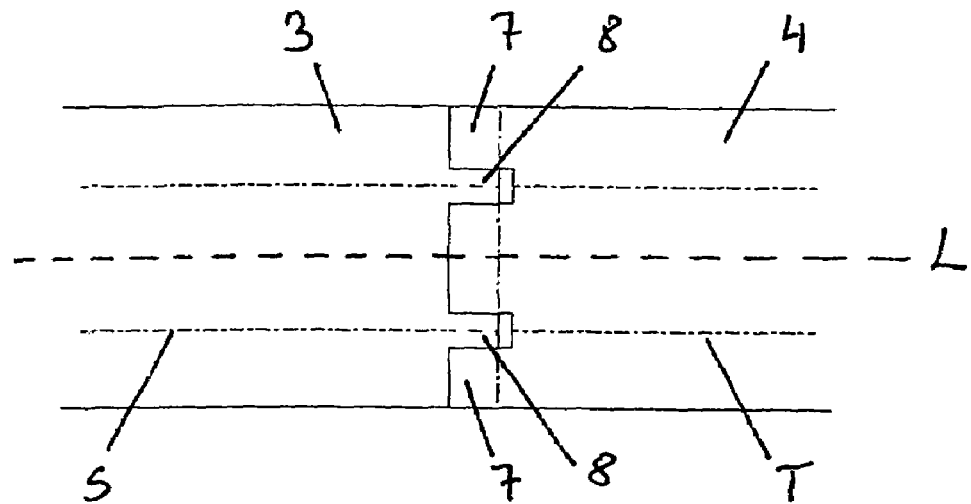
FIG. 11 shows a schematic representation of initial and end section from above, with the end section being slid into the initial section according to FIG. 10 in accordance with a further step of the embodiment of the method in accordance with the invention.
Figure 12:
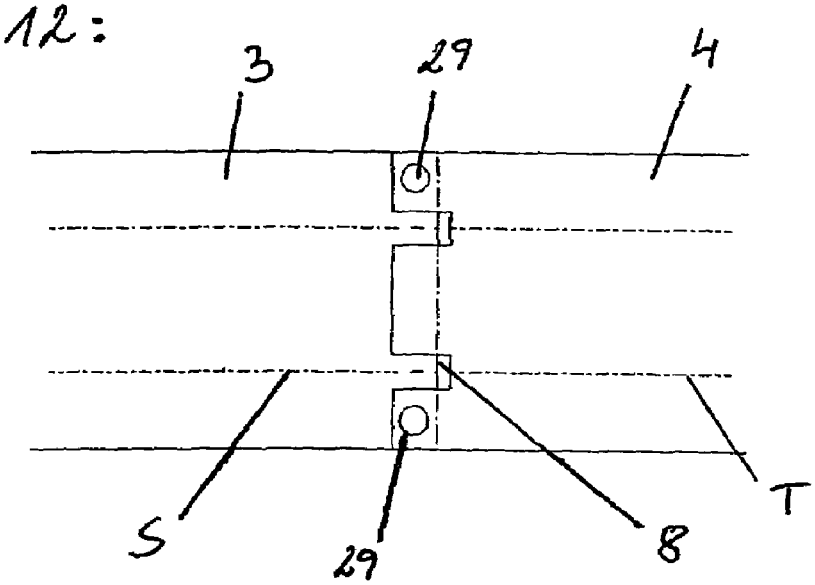
FIG. 12 shows a schematic representation of initial and end section from above, with the end section being welded together with the initial section according to FIG. 10 in accordance with a further step of the embodiment of the method in accordance with the invention.

FIG. 10 shows a schematic representation of initial and end section 3, 4 as seen from above, with the end section 4 being provided in a first step of the method in accordance with the invention with slots 8 in the direction of the longitudinal axis L, e.g. with the help of a cutting element 12 for example (see FIG. 2a analogously). The placement of the cut occurs here in the boundary regions of the end section 4 and is also known as "unlatching", with a tab 7 each being formed which projects in the longitudinal direction L of the film tube 5. The positioning of the slots 8 is variable and is adjusted approximately to the different widths of the film tube 4. As is shown in FIG. 11, which again shows a schematic representation of initial and end section 3, 4 from above, the end section 4 is subsequently pushed into the initial section 3, which occurs in such a way that the tabs 7 are each inserted between the inner side surfaces 17, 18 of the initial section 3. This is achieved in such a way that the respective fold axis S of the initial section 3 is threaded into the respective slot 8, as will be explained below in closer detail. In a final step, the initial section 3 is welded together with the end section 4 in its boundary regions, with FIG. 12 indicating the respective welding points 29. In the central regions of the film tubes 2 and 5 it is not necessary that any welding occurs because the initial section 3 also overlaps the end section 4 in this joining variant. An inserted mandrel 25 is thus smoothly transferred from the old film tube 5 to the new film tube 2, even when no welding seam was placed in the central regions. It is clearly visible that the same also applies to a side wedge 32 guided between the inner side surfaces 17, 18, 19, 20 of the side folds.

As was already mentioned, the welding in the boundary regions leads to the advantage that the welding anvil 14 provided for the welding does not have to be introduced into the central regions of the film tubes 2, 5, but merely needs to extend in the boundary regions of the film tubes 2, 5. It can be guided approximately between the inner side surfaces 17, 18, 19, 20 of the side folds where it can also remain during the other process steps. FIGS. 13 to 15 show perspective views of the initial section 3 of the new film tube 2 and the inserted end section 4 of the old film tube 4 for clarification purposes. The drawings especially show the relative arrangement of the inner side surfaces 17, 18 of the initial section 3 and the inner side surfaces 19, 20 of the end section 4 as well as the welding anvil 14 inserted between said side surfaces 17, 18, 19, 20. The welding heads of the welding system 13 (not shown in FIGS. 13 to 15) are arranged above and below the outer side surfaces 10, 11, 15, 16. Welding anvil 14 engages in the side folds of the film tubes 2, 5 and can remain in this position during the other process steps. Since the insertion of a welding anvil into the central regions of the film tubes 2, 5 is omitted prior to the welding, the process is clearly accelerated. FIG. 14 shows a perspective view according to FIG. 12 from below. FIG. 15 shows a detailed view of the marked region according to FIG. 13. It can be seen in particular how the fold axis S is introduced into the respective slot 8, so that the inner side surfaces 17, 18 of the initial section 3 overlap the outer side surfaces 15, 16 of the end section 4. The welding anvil 14 can be seen again which supports the placement of the welding points 29.

FIG. 16 shows for further clarification a perspective view of the end section 4 which was provided with slots 8 in the direction of the longitudinal axis L of the film tube 5. As was already mentioned, tabs 7 are thus formed in the boundary regions of the end section 4.

According to the method in accordance with the invention, the two joined film tubes 2 and 5 can be guided smoothly through the further sections in the system. The method in accordance with the invention ensures in particular that a tube is produced after the joining of the two film tubes 2 and 5 again. The method in accordance with the invention can be used in systems with a flying mandrel 25 and in systems with a wedge 28 or vacuum suctions means 27.

Longer standstill periods during a change of the tube roll can thus be prevented with the help of the method in accordance with the invention.

The invention claimed is:

1. A method for joining an initial section of a film tube which is wound up in a band-like manner on a reel with an end section of a second film tube extending over subsequent processing stations, especially a packaging system, in an at least partly band-like manner, with the band-like initial and end section each having two mutually superimposed outer lateral surfaces which each converge in their boundary regions into two interposed, inwardly folded inner lateral surfaces which thus form an inwardly situated fold axis, wherein in the two outer boundary regions of the end section a respective first tab and a respective second tab are formed by placing a respective first cut and a respective second cut, which first tab and second tab are joined in a tension-proof manner with the opposite initial section, with the initial section overlapping the end section, and the placement of the first cut and second cut on the end section is carried out in such a way that the first tab and the second tab each which projects in the longitudinal direction of the film tube are formed in the boundary regions of the end section, which first tab and second tab are inserted between the inner lateral surfaces of the initial section and are joined to the initial section in a tension-proof way.

2. A method for joining an initial section of a film tube which is wound up in a band-like manner on a reel with an end section of a second film tube extending over subsequent processing stations, especially a packaging system, in an at least partly band-like manner, with the band-like initial and end section each having two mutually superimposed outer lateral surfaces which each converge in their boundary regions into two interposed, inwardly folded inner lateral surfaces which thus form an inwardly situated fold axis, wherein the placing of the cut occurs by means of a cutting element arranged on either side of the film tube in the two outer boundary regions of the initial section along the inner fold axis by horizontally moving the cutting element from a first position in which it is spaced from the film tube to a second position in which it slits open the film tube laterally in the longitudinal direction of the film tube, and the thus formed tabs are each placed from the outside onto the outer lateral surfaces of the end section and are joined to the same in a tension-proof way.

3. A method according to claim 1, wherein the placement of the cut in the end section occurs in such a way that slots are formed in the boundary regions of the end section which each extend in the longitudinal direction of the film tube into which the respective inner side surfaces of the initial section are inserted along their fold axis.

4. A method according to claim 1, wherein the width of the first tab and second tab corresponds substantially to the width of the respective inner side surfaces of the initial section.

5. A method according to claim 1, wherein the tension-proof connection of the initial and end sections of the film tubes is formed by welding.

6. A method according to claim 5, wherein the welding occurs by means of ultrasonic sound.

7. A method according to claim 1, wherein the initial section is widened by means of negative pressure or electrostatic methods before the initial and end section are placed above one another.

8. A method according to claim 5, wherein for welding the initial and end sections of the film tubes respective welding anvils are inserted laterally between the inner side surfaces on which the respective tabs each and the respective boundary regions of the initial and end section are placed and welded together.

9. A packaging system with a reel on which a film tube is wound up, a positioning and tensioning station which unwinds the film tube from the reel and supplies the same to subsequent sections of the system, a packaging unit for processing film tube section and a conveying device for removing packaged goods, wherein at least one cutting apparatus for cutting the film tube and a welding station for processing the film tube are arranged between the positioning and tensioning station and the packaging unit, with the cutting apparatus being a cutting element arranged on either side of the film tube, which cutting element is horizontally movable from a first position in which it is spaced from the film tube to a second position in which it slits open the film tube laterally in the longitudinal direction of the film tube.

10. A packaging system according to claim 9, wherein the welding station comprises an ultrasonic welding station.

11. A packaging system according to claim 9, wherein pivoting suction means are arranged between the positioning and tensioning station and the packaging unit.

* * * * *